(12) United States Patent
Ono (10) Patent No.: US 10,027,823 B2
(45) Date of Patent: *Jul. 17, 2018

(54) OPERATION GUIDING APPARATUS (71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Shinji Ono, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/489,803

(22) Filed: Apr. 18, 2017

(65) Prior Publication Data

US 2017/0223202 A1    Aug. 3, 2017

Related U.S. Application Data

(63) Continuation of application No. 14/724,928, filed on May 29, 2015, now Pat. No. 9,661,164.

(51) Int. Cl.
*G06F 3/12* (2006.01)
*H04N 1/00* (2006.01)
(Continued)

(52) U.S. Cl.
CPC ..... *H04N 1/00411* (2013.01); *G06K 9/00362* (2013.01); *H04N 1/00037* (2013.01); *H04N 2201/0094* (2013.01)

(58) Field of Classification Search
CPC ............. G06K 15/005; G06K 9/00362; H04N 1/00037; H04N 1/00411; H04N 1/00204;
(Continued)

(56) References Cited

U.S. PATENT DOCUMENTS

2009/0091786 A1    4/2009    Yamaguchi et al.
2011/0096359 A1    4/2011    Taniuchi
(Continued)

FOREIGN PATENT DOCUMENTS

JP          10-307512       11/1998

OTHER PUBLICATIONS

Non-Final Office Action for U.S. Appl. No. 14/724,928 dated Apr. 7, 2016, 28 pages.
(Continued)

*Primary Examiner* — Gabriel Garcia
(74) *Attorney, Agent, or Firm* — Amin, Turocy & Watson LLP (57) ABSTRACT

A guidance apparatus comprises: an operation section configured to receive an operation from a user; a first detection section configured to detect a user in front of the operation section; a confirmation processing section configured to confirm the existence of a user operating the operation section according to the detection result of the first detection section; a determination processing section configured to determine whether or not the operation section receives an operation from the user within a certain period of time after the confirmation processing section confirms the existence of the user; and a guidance information output section configured to output guidance information for guiding the user in operating the operation section if the determination processing section determines that the operation section receives no operation from the user.

9 Claims, 6 Drawing Sheets

(51) Int. Cl.
*G06K 9/00* (2006.01)
*G06K 15/00* (2006.01)

(58) Field of Classification Search
CPC ........... H04N 1/00251; H04N 1/00408; H04N
1/00437; H04N 1/4413; H04N 1/4426;
H04N 2201/0094; G06F 3/013; G06F
3/0425; G06F 3/005; G06F 3/011; G06F
3/1204; G06F 3/126; G06F 3/1288
USPC .......................... 358/1.1–1.18, 402; 345/156
See application file for complete search history.

(56) References Cited

U.S. PATENT DOCUMENTS

| | | |
|---|---|---|
| 2014/0063528 A1 | 3/2014 | Hirose |
| 2014/0064774 A1* | 3/2014 | Masumoto ......... G03G 15/5016 399/88 |
| 2014/0126018 A1 | 5/2014 | Sugimoto |
| 2015/0183608 A1 | 7/2015 | Onishi |
| 2015/0227820 A1 | 8/2015 | Dupre et al. |
| 2015/0281521 A1 | 10/2015 | Takeuchi |

OTHER PUBLICATIONS

Final Office Action for U.S. Appl. No. 14/724,928 dated Sep. 26, 2016, 14 pages.

* cited by examiner

12b: BASIC DATA FILE

| DATA ID | BASIC INFORMATION |
|---|---|
| OUTPUT a1 | BASIC INFORMATION a1 |
| OUTPUT a2 | BASIC INFORMATION a2 |
| ⋮ | ⋮ |
| OUTPUT b1 | BASIC INFORMATION b1 |
| OUTPUT b2 | BASIC INFORMATION b2 |
| ⋮ | ⋮ |

FIG.5

12c: GUIDANCE DATA FILE

| DATA ID | GUIDANCE INFORMATION | DETECTION SECTION ID | OPERATION SECTION ID |
|---|---|---|---|
| OUTPUT a1 | GUIDANCE INFORMATION a1 | DETECTION SECTION 13,14 | OPERATION SECTION 16 |
| OUTPUT a2 | GUIDANCE INFORMATION a2 | DETECTION SECTION 13,14 | OPERATION SECTION 16 |
| ⋮ | ⋮ | ⋮ | ⋮ |
| OUTPUT b1 | GUIDANCE INFORMATION b1 | DETECTION SECTION 15 | OPERATION SECTION MT |
| OUTPUT b2 | GUIDANCE INFORMATION b2 | DETECTION SECTION 15 | OPERATION SECTION MT |
| ⋮ | ⋮ | ⋮ | ⋮ |

FIG.6

12d: ERROR CODE FILE

| ERROR CODE | ERROR CONTENT | DATA ID |
|---|---|---|
| ERROR CODE E1 | ERROR CONTENT 1 | OUTPUT b1 |
| ERROR CODE E2 | ERROR CONTENT 2 | OUTPUT b2 |
| ⋮ | ⋮ | ⋮ |

OPERATION GUIDING APPARATUS

CROSS-REFERENCE TO RELATED APPLICATIONS

This application is a Continuation of application Ser. No. 14/724,928 (now U.S. Pat. No. 9,661,164) filed on May 29, 2015, the entire contents of which are incorporated herein by reference.

FIELD

Embodiments described herein relate to an operation guiding apparatus.

BACKGROUND

A power supply control device (Japanese Patent Application No. JP2012-114499) is well known which is used to switch the action mode of a processing apparatus such as a copier or a fax machine when a user approaches the processing apparatus. If a user approaching the processing apparatus is detected when the processing apparatus runs in a power-saving mode in which the power consumption of the processing apparatus is suppressed, then the power control device switches the action mode of the processing apparatus from the power-saving mode to a common mode (a mode in which power saving is released). The power control device is capable of effectively reducing the power consumption of the processing apparatus.

However, a user who does not know how to use the processing apparatus needs to consult an operation manual or other people about the use method of the processing apparatus, which is troublesome.

In view of this problem, the present invention is intended to provide a guiding apparatus and a guiding method for improving the operation ability of a user.

DETAILED DESCRIPTION

According to an embodiment, a guiding apparatus comprises: an operation section configured to receive an operation from a user; a first detection section configured to detect a user in front of the operation section; a confirmation processing section configured to confirm the existence of a user operating the operation section according to the detection result of the first detection section; a determination processing section configured to determine whether or not the operation section receives an operation from the user within a certain period of time after the confirmation processing section confirms the existence of the user; and a guidance information output section configured to output guidance information for guiding the user in operating the operation section if the determination processing section determines that the operation section receives no operation from the user.

With the use of the guiding apparatus disclosed herein, the operation ability of a user can be improved.

The guiding apparatus and the guiding method involved in embodiments of the present invention are described below with reference to accompanying drawings. An example of a guiding apparatus applied to a Multi-Function Printer (MFP) is described in embodiments of the present invention. The MFP is an all-in-one device which integrates the functions of a copier, a printer, an image scanner, a fax machine and the like.

Figure 1:
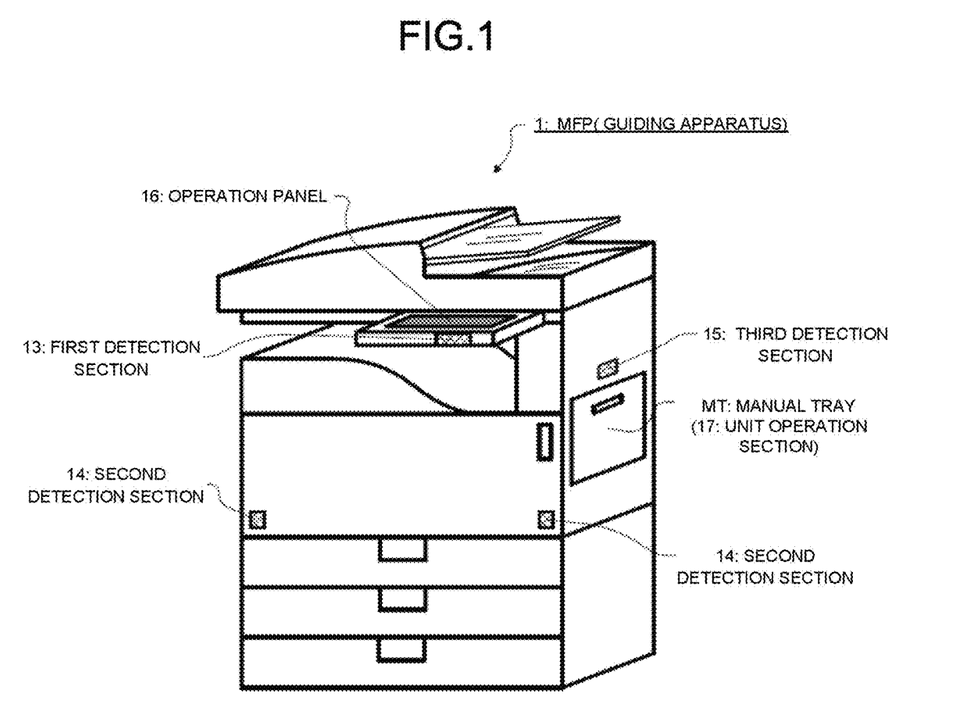
FIG. 1 is a diagram illustrating an MFP (a guiding apparatus) involved in an embodiment of the present invention.

As shown in FIG. 1, an MFP 1 is equipped with an operation panel 16. After determining that the operation panel 16 is not operated by a user in front of the operation panel 16 within a certain period of time, the MFP 1 outputs guidance information for guiding the user in operating the operation panel 16.

Further, after an internal abnormality is detected, the MFP 1 notifies the user of the unit (e.g. manual tray MT) which should be operated to handle the abnormality. After determining that the notified unit is not operated by the user in front of the notified unit within a period of time, the MFP 1 outputs guidance information for guiding the user in operating the notified unit.

Figure 2:
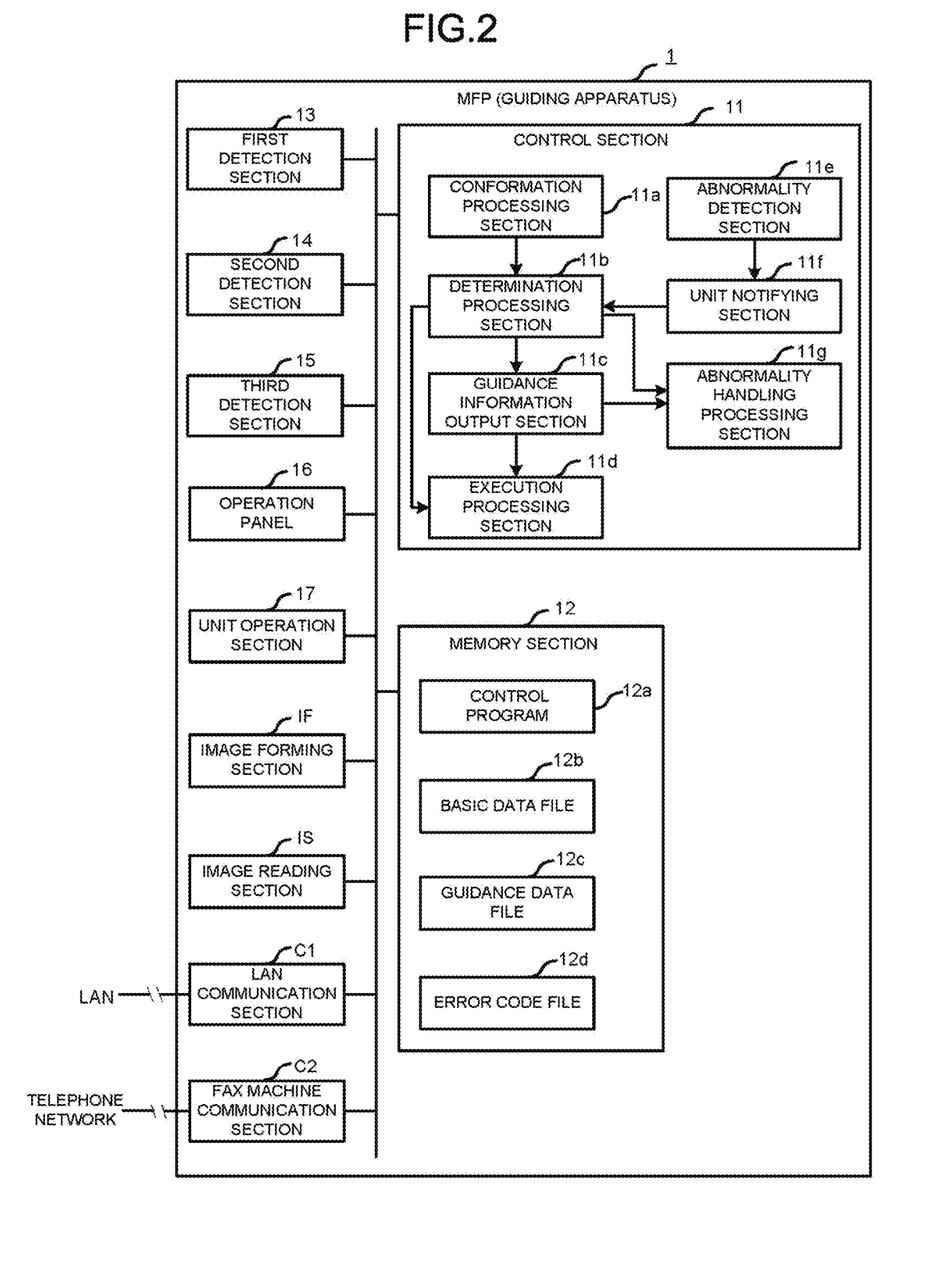
FIG. 2 is a block diagram illustrating the structure of the MFP shown in FIG. 1.

The structure of the MFP 1 shown in FIG. 1 is described with reference to FIG. 2.

The MFP 1 comprises a control section 11, a memory section 12, a first detection section 13, a second detection section 14, a third detection section 15, an operation panel 16, a unit operation section 17, an image forming section IF, an image reading section IS, a Local Area Network (LAN) communication section C1 and a fax machine communication section C2.

Each of the first detection section 13, the second detection section 14 and the third detection section 15 consists of a reflector-type photoelectric sensor or an ultrasonic sensor. The first detection section 13, the second detection section 14 and the third detection section 15 are all used to detect the existence of an object (person), and the detection ranges of the first detection section 13, the second detection section 14 and the third detection section 15 are, for example, 0-0.8 m.

Figure 3:
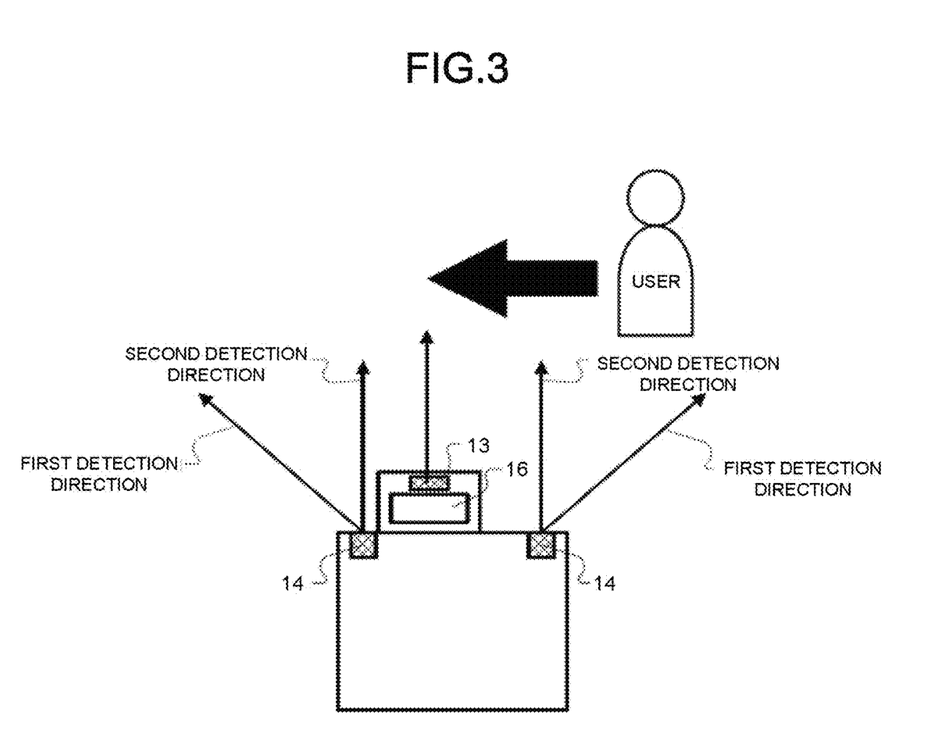
FIG. 3 is a diagram illustrating an example of the detection of a user approaching an operation panel through a first and a second detection section.

As shown in FIG. 1, the first detection section 13 is arranged on the operation panel 16. As shown in FIG. 3, the first detection section 13 detects a user in front of the operation panel 16.

Two second detection sections 14 are arranged on two sides of the front side of the MFP 1. For example, as shown in FIG. 3, the detection direction of the second detection section 14 is switched between a first detection direction and a second detection direction to detect a user moving around the operation panel 16. The first detection direction is a direction facing the side opposite to the position where the operation panel 16 is arranged. The second detection direction is a direction which faces the operation panel 16 when compared with the first detection direction. In this way, the second detection section 14 detects a user moving around the operation panel 16.

As shown in FIG. 1, to handle an abnormality occurring in the MFP 1, the third detection section 15 is arranged on the unit (e.g. manual tray MT) which should be operated. The third detection section 15 detects a user in front of the unit which should be operated.

The operation panel 16 is provided with a display device such as a liquid crystal display, an operation device for receiving an operation from a user, for example, a button or a switch, and a loudspeaker for outputting sound. Further, the operation panel 16 consisting of the display device and the operation device is partially made up of a touch panel. The operation panel 16 receives various kinds of information from the control section 11 and outputs the received information on a screen or using the loudspeaker. Further, the operation panel 16 sends an operation signal corresponding to an operation of a user to the control section 11.

The unit operation section 17 refers to each operation section of the MFP 1 that is operated according to a requirement of the user. Specifically, in addition to the manual tray MT shown in FIG. 1, the unit operation section 17 further includes a sheet feeding tray section in which a printing medium is accommodated, a sheet discharging tray section for discharging the printing medium and a front cover section for operating the image forming section IF. Further, the unit operation section 17 sends an operation signal corresponding to an operation of the user to the control section 11. In this way, the control section 11 (the undermentioned determination processing section 11b) determines whether or not to operate the unit operation section 17.

The image forming section IF is an image forming apparatus for forming and printing an image on a printing medium. Specifically, the image forming section IF comprises: image forming station for four colors (yellow, magenta, cyan and black) which are arranged to form an image on a printing medium; a fixing portion configured to fix the image formed by the image forming stations on the printing medium; and a conveyance portion configured to convey the printing medium the image on which is fixed by the fixing portion to the sheet discharging tray section.

The image reading section IS is an image reading apparatus for reading the image on the printing medium. Specifically, the image reading section IS comprises: a scanning portion which moves on the printing medium (original document) while irradiating the printing medium (original document) and an image pickup component such as a Charge Coupled Device (CCD) for converting the light (image) obtained by the scanning portion from the printing medium into an electric signal.

The LAN communication section C1 consists of an LAN communication interface device. The LAN communication section C1 communicates with other communication devices (e.g. computer and mobile phone) via an LAN.

The fax machine communication section C2 consists of a telephone network communication interface device. The fax machine communication section C2 communicates with other communication devices (e.g. fax machines) via a telephone network.

The memory section 12 consists of a memory device such as a Hard Disk Drive (HDD), a Read Only Memory (ROM) or a flash memory. Further, the memory section 12 is characterized in storing a control program 12a, a basic data file 12b, a guidance data file 12c and an error code file 12d.

The control program 12a is a program for causing the control section 11 to execute a guidance processing which will be described later.

Figure 4:
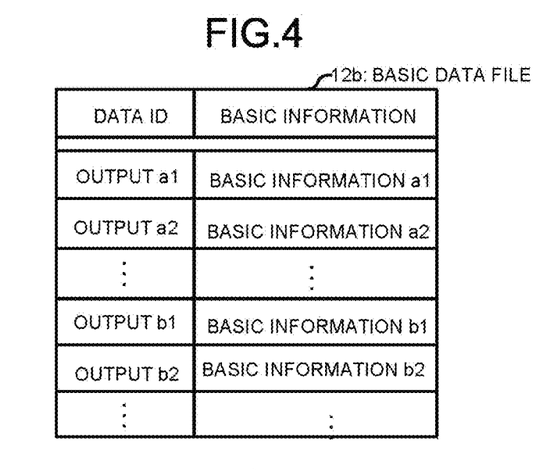
FIG. 4 is a diagram illustrating the structure of the basic data file shown in FIG. 2.

The basic data file 12b is the aggregate of the data output to the operation panel 16 (hereinafter referred to as basic data). As shown in FIG. 4, the basic data file 12b includes basic data in each record. The basic data includes a data ID for identifying basic data and basic information output by the operation panel 16. Specifically, the basic information includes information for setting the functions (e.g. copy, scan and fax) executed by the MFP 1 and information for setting details of the executed functions. Further, the basic information includes information representing the unit (e.g. manual tray MT) which should be operated to handle an abnormality.

Figure 5:
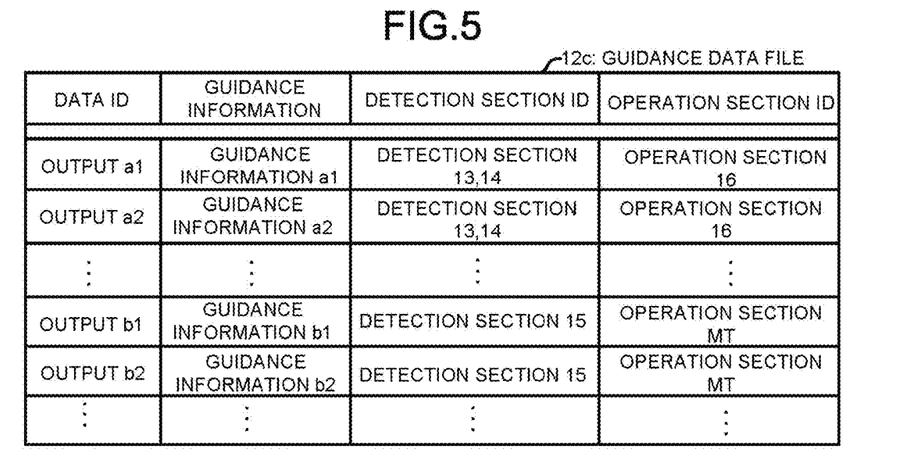
FIG. 5 is a diagram illustrating the structure of the guidance data file shown in FIG. 2.

The guidance data file 12c is the aggregate of the data for providing guidance for the user (hereinafter referred to as guidance data). As shown in FIG. 5, the guidance data file 12c includes guidance data in each record. The guidance data has a data ID for identifying basic data, guidance information, a detection section ID and an operation section ID. The guidance information is output to the operation panel 16. The guidance information is information for providing guidance for the user aiming at the basic information corresponding to a data ID. Specifically, the guidance information includes detailed information, for example, the content or operation steps, of basic information. The detection section ID is used to identity a detection section. The operation section ID is used to identity an operation section.

Figure 6:
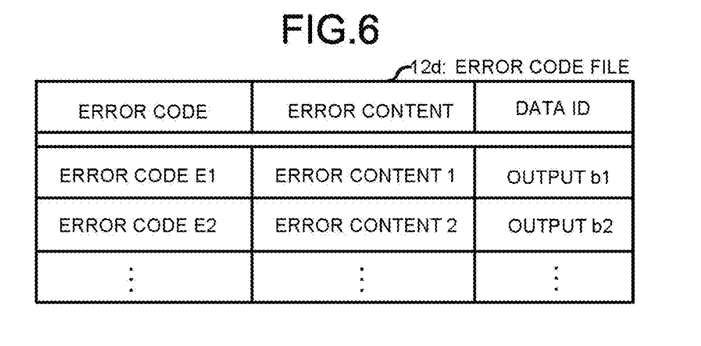
FIG. 6 is a diagram illustrating the structure of the error code file shown in FIG. 2.

The error code file 12d is the aggregate of the data for identifying an error which may occur in the MFP 1. As shown in FIG. 6, the error code file 12d includes, in each record, an error code for identifying an error, the content of an error and a data ID for identifying basic data.

The control section 11 comprises a Central Processing Unit (CPU), a Random Access Memory functioning as the main memory of the CPU, a timer and so on. The control section 11 controls the whole MFP 1.

Once started, the control section 11 of the MFP 1 executes the control program 12a stored in the memory section 12. In this way, the control section 11 functions as a confirmation processing section 11a, a determination processing section 11b, a guidance information output section 11c, an execution processing section 11d, an abnormality detection section 11e, a unit notifying section 11f and an abnormality handling section 11g.

The MFP 1 with the foregoing structure concurrently executes the following two guidance processing:

(1) a first guidance processing for guiding the user in using the operation panel 16;

(2) a second guidance processing for guiding the user in handling an abnormality in the MFP 1.

Figure 7:
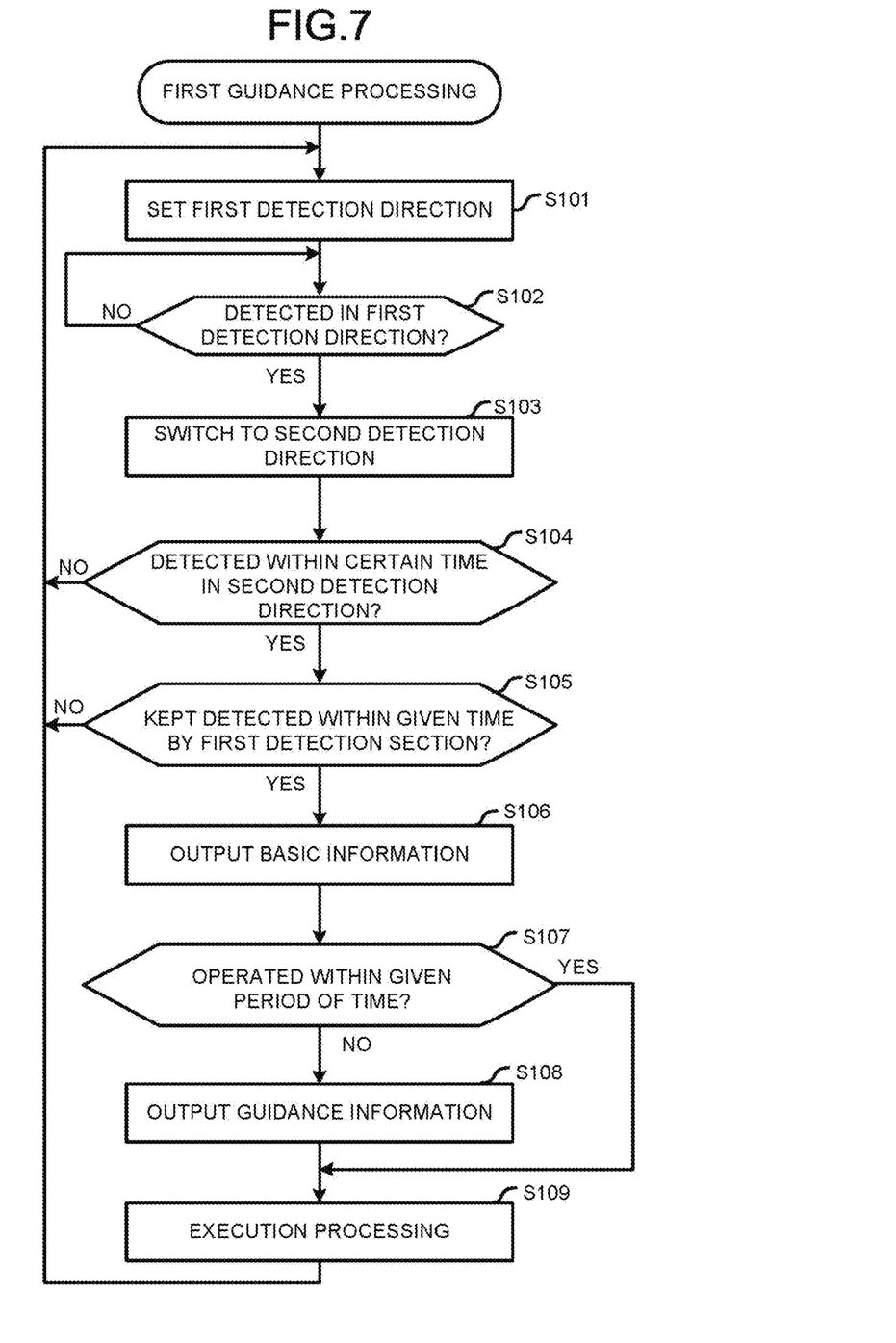
FIG. 7 is a flowchart illustrating a first guidance processing carried out by an MFP.

The first guidance processing (Act S10) is described first with reference to FIG. 7.

As shown in FIG. 3, the confirmation processing section 11a sets the detection directions of the second detection sections 14 on two sides of the front side of the MFP 1 to be 'first detection direction' (Act S101). The confirmation processing section 11a determines whether or not a user is detected by the second detection sections 14 the detection directions of which are set to be 'first detection direction' (Act S102). The confirmation processing section 11a is kept standby until a user is detected (Act S102: No). Further, when running in a power-saving mode (a mode in which power consumption is suppressed), the MFP 1 supplies power for the second detection sections 14 but cuts off the power supply for the other sections (e.g. the first detection section 13, the third detection section 15, the operation panel 16, the unit operation section 17, the image forming section IF and the image reading section IS.)

After determining that a user is detected by either of the second detection sections 14 (Act S102: Yes), the confirmation processing section 11a switches the detection direction of the second detection section 14 by which the user is detected to 'second detection direction' (Act S103). The confirmation processing section 11a determines whether or not a user is detected by the second detection section 14 the detection direction of which is switched to 'second detection direction' within a given period of time (e.g. within three seconds). Further, when running in the power-saving mode, the MFP 1 may also cut off the power supply for the second detection section 14 by which no user is detected.

After determining that no user is detected by the second detection section 14 the detection direction of which is switched to 'second detection direction' (Act S104: No), the confirmation processing section 11a returns to execute processing in Act S101. That is, in this case, it is determined that no user approaches the operation panel 16 (MFP 1) in the first detection direction, thus, no operation guidance is provided for a user.

On the other hand, if it is determined in Act S104 that a user is detected by the second detection section 14 (Act S104: Yes), then the confirmation processing section 11a determines whether or not a user is kept detected by the first detection section 13 for a given period of time (e.g. 5 seconds) following the foregoing certain period of time (e.g. 3 seconds). Further, when the MFP 1 runs in the power-saving mode, the confirmation processing section 11a supplies power for the first detection section 13. Moreover, the confirmation processing section 11a may cut off the power supply for the second detection section 14.

After determining that no user is not kept detected by the first detection section 13 for the given period of time following the foregoing certain period of time (Act S105: No), the confirmation processing section 11a returns to execute the processing in Act S101. That is, in this case, it is determined that the user in the second detection direction passes the operation panel 16 (MFP 1), thus, no operation guidance is provided for a user.

On the other hand, if it is determined in Act S105 that a user is detected by the first detection section 13 (Act S105: Yes), then the confirmation processing section 11a confirms the existence of the user in front of the operation panel 16. That is, in this case, it is determined that there is a user approaching the operation panel 16, and the guidance processing is continued for the user.

After the existence of the user is confirmed by the confirmation processing section 11a, the determination processing section 11b outputs the original basic information (herein referred to as 'basic information a1') stored in the basic data file 12b of the memory section 12 to the operation panel 16. Then, a screen representing items for setting the functions (e.g. copy, scan and fax) executed by the MFP 1 is output on the operation panel 16. Further, if the MFP 1 runs in the power-saving mode, the determination processing section 11b switches the power-saving mode to a common mode to supply power for the other units (e.g. the third detection section 15, the operation panel 16, the unit operation section 17, the image forming section IF and the image reading section IS.)

In this case, a user familiar with the operation of the MFP 1 can operate the MFP 1 based on the basic information output to the operation panel 16, but a user not familiar with the operation of the MFP 1 may need some time for study before operating the MFP 1 or even cannot operate the MFP 1.

The determination processing section 11b determines whether or not the operation panel 16 is operated within a given period of time (e.g. 15 seconds) (Act S107), Act S109 is executed after the determination processing section 11b determines that the operation panel 16 is operated (Act S107: Yes). That is, in this case, it is deemed that the user operating the operation panel 16 is familiar with the operation of MFP 1, thus, no operation guidance is provided for the user.

On the other hand, if the determination processing section 11b determines that the operation panel 16 is not operated (Act S107: No), the guidance information output section 11c outputs the guidance information ('guidance information' a1) which is stored in the guidance data file 12c of the memory section 12 corresponding to the basic information ('basic information a1') output to the operation panel 16 to the operation panel 16 (Act S108). Then, the content or detailed description on the operation steps (function description, the positions of buttons for selecting the functions and operation methods) of the functions (e.g. copy, scan and fax) executed by the MFP 1 is output to the operation panel 16 by displaying the detailed description on the operation panel 16 or by using a loudspeaker.

If the determination processing section 11b determines that the operation panel 16 is operated in Act S107 (Act S107: Yes), or after Act S108 is executed, the execution processing section 11d accepts an operation of setting the processing to be executed by the MFP 1. The user sets the details of the function to be executed through the operation panel 16 and caries out an operation to execute the set processing (an operation of selecting a 'start' button). The execution processing section 11d executes the set processing according to the operation (Act S109). Then, the execution processing section 11d waits in a standby state until the operation panel 16 is operated, if the operation panel 16 is not operated within a certain period of time, then the action mode is switched to the power-saving mode, and the flow returns to Act S101.

Then, the series of actions of the first guidance processing is ended.

Figure 8:
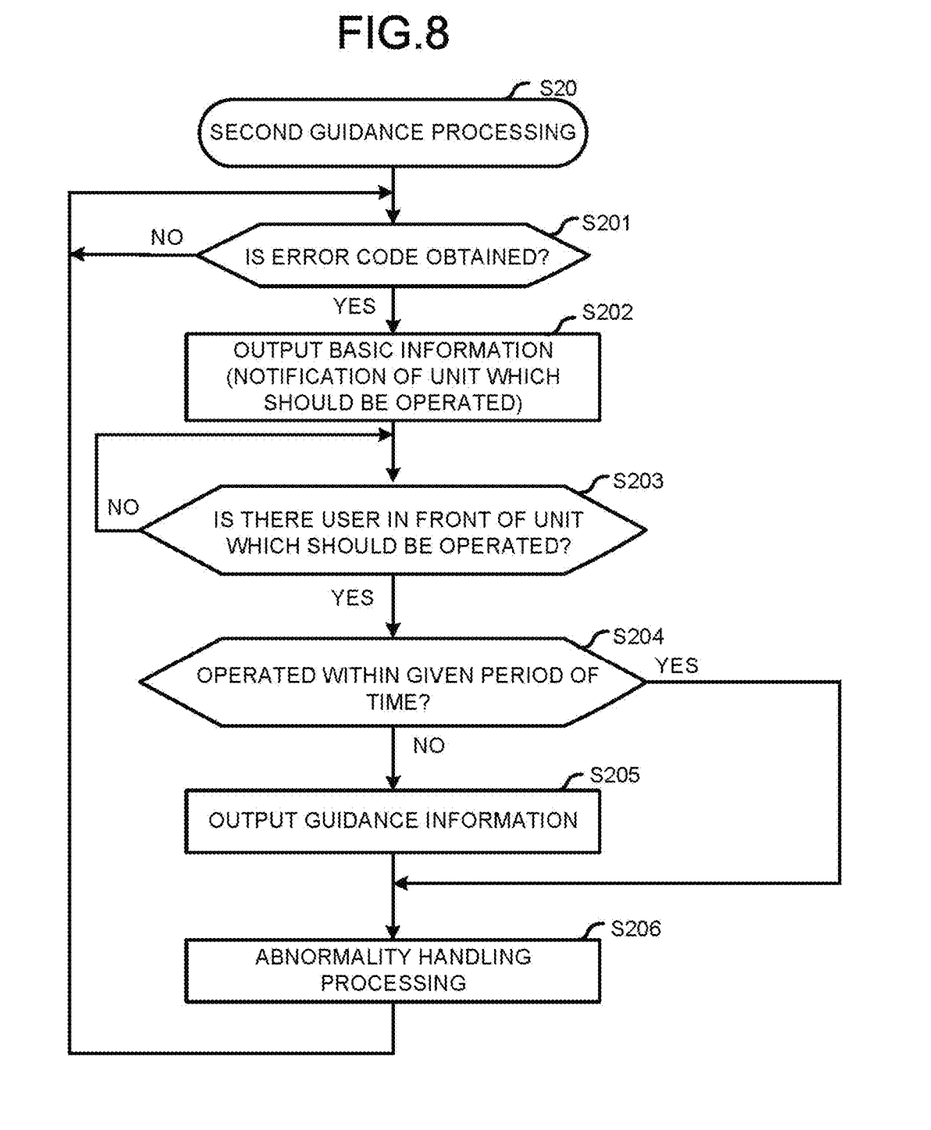
FIG. 8 is a flowchart illustrating a second guidance processing carried out by an MFP.

Next, the second guidance processing is described with reference to FIG. 8.

The abnormality detection section 11e keeps standby until an error code is obtained (Act S201: No).

The abnormality detection section 11e detects an abnormality when an error code is acquired by the image forming section IF, the image reading section IS or the unit operation section 17 (Act S201: Yes). At this time, the unit notifying section 11f outputs basic information to the operation panel 16 to notify the user of the unit which should be operated. For example, when the abnormality detection section 11e acquires 'error code E1', the unit notifying section 11f extracts, from the error code file 12d stored in the memory section 12, a data ID ('output b1') corresponding to the error code. Next, the unit notifying section 11f extracts, from the basic data file 12b stored in the memory section 12, basic information ('basic information b1') corresponding to the extracted data ID and outputs the extracted information to the operation panel 16. Then, the unit (e.g. manual tray MT) which should be operated to handle the abnormality in the image forming section IF is notified on the operation panel 16 by displaying the unit on the operation panel 16 or by using a loudspeaker.

Sequentially, the determination processing section 11b determines whether or not there is a user in front of the unit which should be operated (Act S203). Specifically, for example, when a data ID ('output b1') is extracted by the unit notifying section 11f, the determination processing section 11b extracts, from the guidance data file 12c stored in the memory section 12, a detection section ID ('detection section 15') corresponding to the extracted data ID. The determination processing section 11b determines whether or not there is a user in front of the unit which should be operated according to whether or not a user is detected by the third detection section 15 corresponding to the extracted detection ID.

The determination processing section 11b determines that there is a user in front of the unit which should be operated (Act S203: Yes) if a user is detected by the third detection section 15. In this case, the determination processing section 11b determines whether or not an operation is carried out within a given period of time (e.g. 8 seconds) (Act S204).

Here, if the user is familiar with the use of the MFP 1, then the user starts to operate the notified unit (here, manual tray MT) to handle the abnormality, if the user is not familiar with the use of the MFP 1, then the user needs some time for study before operating the unit or even cannot operate the unit.

The unit operation section 17 provided with the notified unit (here, manual tray MT) sends an operation signal corresponding to the operation of the user to the determination processing section 11b. After receiving the operation signal, the determination processing section 11b determines that the notified unit is operated (Act S204: Yes). Then, the determination processing section 11b executes processing in Act S209. That is, in this case, it is deemed that the user is familiar with the use of the MFP 1, thus, no operation guidance is provided for the user.

On the other hand, if the determination processing section 11b determines that the operation panel 16 is not operated in Act S204 (Act S204: No), the guidance information output section 11c outputs the guidance information ('guidance information' b1) which is stored in the guidance data file 12c of the memory section 12 corresponding to the basic information ('basic information b1') output to the operation panel 16 to the operation panel 16 (Act S205). In this way, the content of an error, a method for operating the notified unit (manual tray MT) and detailed description on handling steps are output to the operation panel 16 by displaying the content on the operation panel 16 or by using a loudspeaker.

If the determination processing section lib determines that the operation panel 16 is operated in Act S204 (Act S204: Yes), or after Act S205 is executed, the abnormality handling processing unit 11g receives an abnormality handling operation of the user. The user handles the abnormality through the notified unit. Then, the abnormality detection section 11e carries out the same processing when acquiring an error code again. On the other hand, the abnormality detection section 11e returns to execute Act S201 if no error code is acquired.

Then, the series of actions of the second guidance processing is ended.

According to the MFP 1 involved in the embodiment, guidance information for guiding a user in front of an operation panel 16 in operating the operator panel 16 is output if it is determined that the operation panel 16 is not operated by the user in front of the operation panel 16 within a certain period of time. Thus, even a user not familiar with the operation of the MFP 1 can easily operate the MFP 1. Further, according to the MFP 1, the unit which should be operated to handle an abnormality in the MFP 1 is notified after the abnormality in the MFP 1 is detected, and after it is determined that the unit is not operated by the user in front of the unit within a certain period of time, guidance information is output to guide the user in handling the abnormality, thus, even a user not familiar with the operation of the MFP 1 can easily handle the abnormality. In this way, the MFP 1 improves the operation ability of the user.

Further, in the foregoing embodiments, for the sake of convenience in description, an example of a piece of guidance information output corresponding to a piece of basic information is described. The guidance information is merely exemplary. For example, in the execution processing shown in Act S109, the execution processing section 11d successively outputs the basic information selected according to the operation of the user to the operation panel 16, in this case, whether or not the operation panel 16 is operated within a given period of time is determined, and if the operation panel 16 is operated within the given period of time, guidance information corresponding to the basic information output to the operation panel 16 may also be output.

Further, in the foregoing embodiments, when the unit (e.g. manual tray MT) is notified which should be operated to handle an abnormality, the third detection section 15 detects a user in front of the unit. However, the third detection section 15 may also function as the first detection section, and the unit operation section 17 may function as the operation panel 16 described in the foregoing embodiments. That is, in this case, the confirmation processing section 11a confirms, according to the detection result of the third detection section 15, that there is a user operating the unit operation section 17. Further, the determination processing section 11b determines whether or not the unit operation section 17 receives an operation from the user within a given period of time after the confirmation processing section 11a confirms the existence of the user. Moreover, if the determination processing section 11b determines that no operation is received by the unit operation section 17 from the user, the guidance information output section 11c outputs guidance information for guiding the user in handling the abnormality.

Further, the MFP 1 may also determine the posture of the user according to the result of the detection section and determine the operation section used by the user according to the determined posture. For example, detection sections 13 are separately arranged for a plurality of operation sections (operation panel 16 and unit operation section 17) in the height direction. In this case, the detection direction of the detection section 13 arranged on the operation panel 16 is set to face up obliquely, and that of the detection section 13 arranged on a sheet feed tray is set to face down obliquely. In this way, if a user is detected by detection sections 13 of the operation panel 16 and the sheet feed tray, then it can be determined that the posture of the user is a standing posture and that the operation section used by the user is the operation panel 16. On the other hand, if the detection section 13 of the sheet feed tray carries out a detection operation while that of the operation panel 16 carries out no detection operation, then it can be determined that the posture of the user is a squat posture and that the operation section used by the user is the sheet feed tray. In this way, the MFP 1 can determine the posture of a user according to the detection results of a plurality of detection sections 13 arranged in the height direction and determine the operation section used by the user according to the determined posture. Moreover, in this case, if the determined operation section is not operated within a given period of time, then the MFP 1 outputs guidance information for guiding the user in operating the operation section.

Further, after the MFP 1 executes the set processing (after the MFP 1 executes Act S109 shown in FIG. 7) and determines the departure of the user from the operation panel 16, the mode of the MFP 1 is switched from the action mode to the power-saving mode. The departure of the user from the operation panel 16 can be determined through a process reverse to the process of determining the existence of a user in front of the operation panel 16. That is, after it is determined that no user is detected by the first detection section 13, the second detection section 14 is set to detect a user first in the second detection direction and then in the first detection direction, and the departure of the user from the operation panel 16 can be determined when a user is detected in either of the detection directions.

Further, in the foregoing embodiments, although an example of the application of a guiding apparatus to an MFP is described, the guiding apparatus may be applied to any one of a copier, a printer, an image scanner and a fax machine or a combination thereof. Further, the guiding apparatus can also be applied to various apparatuses which need to be operated by the user.

The present invention is not limited to the foregoing embodiments or accompanying drawings, and the foregoing embodiments or accompanying drawings can be properly modified.

What is claimed is:

1. An operation guiding apparatus, comprising:
an operator configured to receive an operation from a user;
a first detector configured to detect the user in front of the operator;
a second detector configured to detect the user moving around the operator in a first detection direction which faces the side opposite to the position of the operator and in a second detection direction which faces the operator when compared with the first detection direction; and,
a processor configured to:
determine whether or not the operator receives an operation from the user if a user is detected by the second detector in the first and the second detection direction and kept detected by the first detector for a first predetermined time,
output basic information in the operator if the user is kept detected by the first detector for the first predetermined time after detection by the second detector, and
output a guidance information for guiding an operation if it is determined that no operation is received from the user carried out based on the basic information from the user within a second predetermined time, the guidance information corresponds to the basic information.

2. The operation guiding apparatus according to claim 1, wherein
the processor is further configured to:
output no guidance information for guiding the operation if it is determined that an operation is received from the user within the second predetermined time after the basic information is output in the operator.

3. The operation guiding apparatus according to claim 1, wherein
the basic information includes an information to set a function to execute based on the operation from the user.

4. The operation guiding apparatus according to claim 1, wherein
the processor is further configured to:
switch the detection direction of the second detector to detect the user by the second detection direction after the user is detected in the first detection direction.

5. An operation guiding apparatus, comprising:
an operator configured to receive an operation from a user;
a third detector configured to detect a user in front of the operator; and,
a processor configured to:
detect an abnormality,
notify the operator of basic information of a unit which is operated to handle the detected abnormality,
determine whether or not the unit receives an operation within a third predetermined time after the user in front of the unit which is operated is detected by the third detector, and
output the guidance information for guiding the operation if it is determined that the unit receives no operation carried out based on the basic information from the user within the third predetermined time, the guidance information corresponds to the basic information.

6. An operation guiding apparatus, comprising:
an operator configured to receive an operation from a user;
a first detector configured to detect a user in front of the operator;
a second detector configured to detect the user moving around the operator in a first detection direction which faces the side opposite to the position of the operator and in a second detection direction which faces the operator when compared with the first detection direction; and,
a processor configured to:
detect a user by the second detector in the first and the second detection direction,
determine whether or not the user is kept detected by the first detector for a first predetermined time,
determine whether or not the operator receives an operation from the user if it is determined that the user is kept detected by the first detector for the first predetermined time,
output basic information in the operator if it is determined that the user is detected by the first detector for the first predetermined time, the processor determines whether or not the operation is carried out based on the basic information output to the operator from the user within a second predetermined time, and
output the guidance information for guiding the operation if it is determined that no operation is carried out based on the basic information from the user within the second predetermined time.

7. The operation guiding apparatus according to claim 6, wherein
the processor is further configured to:
determine whether or not the operation is carried out based on the basic information output to the operator from the user within the second predetermined time, and
output no guidance information for guiding the operation if it is determined that the operation is carried out based on the basic information from the user within the second predetermined time.

8. The operation guiding apparatus according to claim 6, wherein
the basic information includes an information to set a function to execute based on the operation from the user.

9. The operation guiding apparatus according to claim 6, wherein
the processor is further configured to:
switch the detection direction of the second detector to detect the user by the second detection direction after the user is detected in the first detection direction.

* * * * *